United States Patent
Gradisar et al.

(10) Patent No.: US 11,323,377 B2
(45) Date of Patent: May 3, 2022

(54) DYNAMIC PRIORITIZATION OF DATA FLOWS

(71) Applicant: Charter Communications Operating, LLC, St. Louis, MO (US)

(72) Inventors: Wynn E. Gradisar, Castle Rock, CO (US); Mark Reimer, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 23 days.

(21) Appl. No.: 16/378,954

(22) Filed: Apr. 9, 2019

(65) Prior Publication Data

US 2020/0328979 A1 Oct. 15, 2020

(51) Int. Cl.
*H04L 47/24* (2022.01)
*H04L 47/2408* (2022.01)
*H04L 47/2441* (2022.01)
*H04L 47/762* (2022.01)

(52) U.S. Cl.
CPC ...... *H04L 47/2441* (2013.01); *H04L 47/2408* (2013.01); *H04L 47/762* (2013.01)

(58) Field of Classification Search
CPC ............. H04L 47/2441; H04L 47/2408; H04L 47/762; H04L 47/24
See application file for complete search history.

(56) References Cited

U.S. PATENT DOCUMENTS

| | | | | |
|---|---|---|---|---|
| 2003/0193395 A1* | 10/2003 | Ahiska | .................. | G08B 25/08 340/540 |
| 2005/0018766 A1* | 1/2005 | Iwamura | .......... | G08B 13/19656 375/240.01 |
| 2006/0171453 A1* | 8/2006 | Rohlfing | .......... | G08B 13/19656 375/240.01 |
| 2011/0126250 A1* | 5/2011 | Turner | ............... | H04N 21/4751 725/109 |
| 2012/0320928 A1* | 12/2012 | Takada | .................... | H04L 69/04 370/401 |
| 2014/0295780 A1* | 10/2014 | Amano | ................. | H04W 48/06 455/90.1 |
| 2016/0049071 A1* | 2/2016 | Beaver | ................. | G08B 29/185 340/514 |
| 2017/0026987 A1* | 1/2017 | Velu | .................... | H04W 72/048 |
| 2017/0301203 A1* | 10/2017 | Matsuura | ............... | G10L 25/51 |

* cited by examiner

*Primary Examiner* — Kent Krueger
(74) *Attorney, Agent, or Firm* — Armis IP Law, LLC

(57) ABSTRACT

According to one configuration, a network environment includes multiple communication devices and a data flow manager (such as associated with a communication gateway). During operation, the data flow manager receives multiple data flows from the multiple communication devices, each of which conveys data associated with a respective communication device in a network environment. The data flow manager controls conveyance of the multiple data flows through the communication gateway. In response to detecting occurrence of an alarm event in the network environment, the data flow manager modifies an original priority of conveying the classified data flows through the communication gateway. The modified priority provides increased bandwidth accommodating conveyance of a corresponding data flow associated with the alarm event through the communication gateway.

37 Claims, 11 Drawing Sheets

PRIORITY
INFO.
145-1

| DEVICE | TYPE | DATA FLOW PRIORITY |
|---|---|---|
| 161 | CAMERA | (DF1)..LOW |
| 162 | CAMERA | (DF2)..LOW |
| 163 | M.C.D (PHONE) | (DF3)...HIGH |
| 164 | GAME DEV | (DF4)....HIGH |
| 165 | COMPUTER | (DF5)...MED |
| ... | | |

PRIORITY FOR NON-ALARM CONDITION

FIG. 2

PRIORITY FOR ALARM CONDITION

PRIORITY INFO. 145-2

| DEVICE | TYPE | DATA FLOW PRIORITY |
|---|---|---|
| 161 | CAMERA | (DF1)..HIGH |
| 162 | CAMERA | (DF2)..HIGH |
| 163 | M.C.D (PHONE) | (DF3)...HIGH |
| 164 | GAME DEV | (DF4)..LOW |
| 165 | COMPUTER | (DF5)..LOW |
| ... | | |

FIG. 3

BANDWIDTH
ALLOCATION
INFO.
146-1

| DEVICE | TYPE | BANDWIDTH |
|---|---|---|
| 161 | CAMERA | LOW |
| 162 | CAMERA | LOW |
| 163 | M.C.D (PHONE) | HIGH |
| 164 | GAME DEV | HIGH |
| 165 | COMPUTER | MED |
| ... | | |

BANDWIDTH ALLOCATION FOR NON-ALARM CONDITION

FIG. 5

BANDWIDTH
ALLOCATION
INFO.
146-2

| DEVICE | TYPE | BANDWIDTH |
|---|---|---|
| 161 | CAMERA | HIGH |
| 162 | CAMERA | HIGH |
| 163 | M.C.D (PHONE) | HIGH |
| 164 | GAME DEV | LOW |
| 165 | COMPUTER | LOW |
| ... | | |

BANDWIDTH ALLOCATION FOR ALARM CONDITION #1

FIG. 8

DYNAMIC PRIORITIZATION OF DATA FLOWS

BACKGROUND

Conventional surveillance systems typically include multiple motion detectors that are distributed throughout a home environment to monitor for intrusions or other events. For example, a home environment can be partitioned to include multiple zones. A corresponding motion detector in each zone (such as a room in a house, portion of a yard, etc.) monitors occurrences of motion in the respective zone being monitored.

The zones of motion detectors in a conventional surveillance system are typically connected to a central controller of the security system that makes decisions about activating a respective alarm. Assuming that a security system is armed, in response to detecting motion in one of the multiple monitored zones, the security system activates the alarm to indicate presence of a moving object. Accordingly, a conventional surveillance system can detect and provide notification of detecting motion, which is presumably an intruder.

Conventional surveillance systems such as those discussed above sometimes provide notification of different types of alarm events over an Internet connection through a WiFi™ router. As is well known, a same WiFi™ router is typically used to support other types of non-surveillance communications such as conveyance of data from gaming devices, mobile phone devices, browsers, etc. Thus, a WiFi™ router in a home can be used to support many different types of data flows for different types of devices operated in the subscriber domain.

One component of today's smart security system is the IP camera because it allows a homeowner to capture images of events inside and around their home and easily convey such data over a network to a target destination. During an alarm event, cameras can be configured to provide real-time information to homeowners, monitoring centers, local authorities, or other emergency response personnel. In certain instances, following an alarm event, the recorded video clips from a surveillance camera can provide valuable information, such as identification of criminal suspects, or visual evidence for insurance claims.

Unfortunately, IP (Internet Protocol) security cameras require a large amount of upstream bandwidth. For example, recommended upstream bandwidth for a single IP camera can be upward of 4 Mbps (Megabytes per second). Upstream bandwidth in a shared communication link (such as a hardwired cable network) is typically very limited compared to download bandwidth in broadband households across the world. Without sufficient bandwidth, the quality of surveillance video communicated through a WiFi™ router will be significantly degraded, or the camera may fail to capture any video at all. This is especially true during alarm events, where a security system may trigger all cameras on the network to record simultaneously and communicate respective captured data upstream through a router to one or more recipients.

BRIEF DESCRIPTION OF EMBODIMENTS

There are deficiencies associated with conventional techniques of monitoring a respective home environment using multiple detectors and providing notification of events (such as alarms and corresponding video) to one or more remote destinations.

For example, homeowners with several simultaneously streaming IP cameras may find their network unable to properly support all of them, especially if each of the surveillance devices competes for use of bandwidth with the multitude of other devices in today's connected home that use a respective WiFi™ router to access the Internet. As the video quality suffers due to network constraints such as congestion, so too does the utility of the video being captured and the corresponding security the cameras are supposed to provide.

In addition to IP surveillance cameras, other alarm devices are increasingly Internet connected as well. For example, smoke detectors, carbon monoxide detectors, etc., are sometimes connected to a hub. The hub needs a reliable and consistent Internet connection during alarm events in order to provide proper notification of an alarm or trigger event to an appropriate monitoring device or personnel.

Embodiments herein provide dynamic prioritization of data flows depending on current conditions in a network environment.

More specifically, a communication management resource receives multiple data flows, each of which conveys (such as via an uplink) data associated with a respective communication device present in a subscriber domain to a remote network such as the Internet. The communication management resource or other suitable resource controls priority and conveyance of the multiple data flows. In response to detecting occurrence of a trigger event (such as an alarm event) in the network environment, the communication management resource modifies an original priority of conveying the data flows through a communication gateway to provide increased bandwidth to a corresponding data flow associated with the alarm event through the communication gateway.

In accordance with further embodiments, if desired, in response to detecting cessation of the trigger (alarm) event in the subscriber domain, the communication management resource reverts to management of conveying the multiple data flows through the communication gateway in accordance with the original priority that was implemented prior to the occurrence of the alarm event. Thus, different operating conditions of the network environment warrant different data flow priority control by the data flow management resource.

Note that further embodiments herein include classifying the multiple data flows conveyed through the communication gateway. For example, in one embodiment, classification of the multiple data flows includes the data flow management resource communicating with the device to identify a device type associated with a first communication device operated in the network environment. The first communication device generates a first data flow for communication through the communication gateway. The data flow management resource or other suitable resource assigns a first priority level in a priority hierarchy to the first device and corresponding first data flow. The data flow management resource identifies a device type associated with a second communication device operated in the network environment; the second communication device generates a second data flow for communication through the communication gateway. The data flow management resource assigns a second priority level in a priority hierarchy to the second device and corresponding second data flow. As further discussed herein, the priority assigned to the different data flows can vary depending on current conditions associated with the subscriber domain.

In one embodiment, the original priority information assigned to the first communication device and the second communication device indicates that the first data flow is higher in the priority hierarchy than the second data flow prior to the occurrence of the alarm event. As previously discussed, the alarm event or particular network condition causes data flow management resource to modify the priority of conveying the data flows. In one embodiment, the modified priority, based on a particular alarm event or trigger condition, indicates that the second data flow is higher in the priority hierarchy than the first data flow during the occurrence of the alarm event. In one embodiment, different alarm events cause the data flows to be assigned different priority.

In yet further embodiments, prior to detecting an alarm condition (such as during a non-alarm condition) in the subscriber domain, the data flow management resource allocates first bandwidth to a first data flow associated with a first communication device in the network environment. Based on the first allocated bandwidth, the data flow management resource communicates the first data flow over the first bandwidth from the first communication device in the network environment through the communication gateway to a corresponding first remote destination. In response to detecting the occurrence of the alarm event, the data flow management resource: i) de-allocates the first bandwidth (or a portion thereof) from communicating the first data flow; and ii) allocates the first bandwidth to provide increased bandwidth and conveyance of the corresponding data flow associated with the alarm event through the communication gateway.

In yet further embodiments, if desired, the data flow management resource provides notification of the alarm event to the first communication device. During the alarm event, the data flow management resource maintains a wireless link between the first communication device and the communication gateway; subsequent to detecting cessation of the alarm event, the data flow management resource resumes conveyance of the first data flow.

Further embodiments herein include receiving a corresponding data flow from a first communication device (such as a security camera) in the network environment prior to detecting the occurrence of the alarm event. In one embodiment, prior to detecting the occurrence of the alarm event, the data flow management resource communicates the corresponding data flow (such as low resolution image data) received from the first communication device in accordance with a first bandwidth allocation through the communication gateway to a respective destination. In response to detecting the occurrence of the alarm event in the network environment, the data flow management resource communicates the corresponding data flow (such as higher resolution image data) from the first communication device in accordance with a second bandwidth allocation through the communication gateway. In one embodiment, the second bandwidth allocation greater than the first bandwidth allocation.

In yet further embodiments, in response to detecting the alarm event, the data flow management resource or other suitable resource can be configured to provide notification to the first communication device; the notification (such as trigger or alarm event) can include a command indicating to the first communication device to increase a resolution of images captured by the first communication device and communicated by the first communication device through the communication gateway. The data flow management resource conveys the increased resolution of the images captured by the first communication device over the corresponding bandwidth allocation (increased amount of bandwidth) assigned to the data flow of the first communication device through the communication gateway during the alarm event. The higher resolution image data is useful to personnel interested in viewing images pertinent to the detected alarm event.

As previously discussed, a respective subscriber domain can include a second communication device. The data flow management resource can be configured to receive the notification (indicating the alarm event) from a second communication device (such as a sensor device) that monitors a region of the network environment in which the first communication device resides. In one embodiment, the data flow management resource reduces bandwidth allocated to a third communication device (such as a gaming device) in the network environment to provide the increased bandwidth to the corresponding data flow (increased resolution of captured images) from the first communication device through the communication gateway.

In accordance with further embodiments, the data flow management resource pauses or substantially reduces data flows associated with one or more non-essential communication devices on the network and increases bandwidth allocation to essential communication devices such as safety devices, cameras, and communication devices, during alarm events in which data flows from the essential communication devices are more important to convey through the communication gateway. In one embodiment, after a smart security hub (coupled to the communication gateway) enters or indicates an alarm state, the security hub notifies the data flow management resource associated with the communication gateway (such as a respective router) of the detected alarm condition. The communication gateway must have device identification enabled, which it will use to classify which devices are related to life-safety, video recording, or communication, i.e. smart security hub, IP camera, mobile phones. Based on the identification and prior classification, the communication gateway disables non-essential or lower priority device traffic during the alarm condition. This will prevent any non-essential network traffic such as; streaming video, online gaming, or internet browsing from competing for bandwidth and connectivity to the router (communication gateway) when such bandwidth is needed for an essential communication transmitting data associated with the alarm event. This provides the homeowner (associated with the subscriber domain) with the strongest and most reliable connection for their safety devices during an alarm condition. Once the alarm event (trigger condition) is resolved, the smart security hub will send another signal to the data flow management resource of the communication gateway indicating that the alarm event has been resolved. The communication gateway (such as router) will then return to a normal non-alarm mode in which non-essential devices (such as gaming devices, web-surfing computer devices, etc.) and corresponding data flows are provided appropriate bandwidth again.

Disabling any non-security related connected devices provides the following benefits to IP security cameras:

1. Highest probability of high quality video capture and upload.

2. Provides the best video quality for the homeowner to view live. This is especially true when the owner is at home, as this invention prioritizes mobile devices so live video can be viewed via mobile application.

3. Provides the best video for professional monitoring centers providing video verification. Clear video capture can expedite the time for the monitoring center to verify the alarm event and dispatch the proper authorities.

4. Some security systems partner with local authorities by providing a portal to view video footage during alarm events. Clear video capture will provide the local authorities with the best information and capability to provide emergency services to the homeowner.

Disabling any non-security related connected devices provides the following benefits to the smart security hub and other life safety devices:

1. Provides the highest probability of successful data communication between the smart security hub and the professional monitoring station.

2. Provides the highest probability of successful data communication with the security devices and the solution providers cloud services.

3. Provides the highest probability for the owner to be able to view the status of the system or devices via a mobile app.

In addition to the benefits above, the pausing or reducing of bandwidth associated with non-essential devices itself serves as a type of personal alert signal. For example, if the alarm panel in a subscriber domain is located in a separate room from the homeowner, or the homeowner cannot hear the alarm panel due to their interaction with an entertainment medium, the interruption of their internet connectivity (such as a gaming device no longer operating properly or displaying a message of the alarm condition) would increase the likelihood of them being alerted to the situation. Embodiments herein can include displaying a notification of an alarm event on any of one or more paused devices.

Note that the dynamic device/data flow prioritization could be used in its existing form to provide permanent priority for a camera or safety device. This is not an optimal solution however, as these devices do not need prioritization except for events when they are capturing video or transmitting alarm signals. Using permanent prioritization on all security devices would minimize the effectiveness of the routers prioritization rules and degrade the overall Wi-Fi connectivity experience of the consumer.

In one embodiment, WiFi™ pausing associated with a respective communication gateway is done via a schedule for specific devices, or by one time application interfaces. A homeowner could pause all non-security devices at night or while they are out of the home to prioritize the security devices during these windows of time. This, however, provides no benefit to the homeowner should an event occur outside of the scheduled pausing times.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to provide surveillance according to embodiments herein. The instructions, when executed by the computer processor hardware, cause the computer processor hardware (such as one or more co-located or disparately processor devices or hardware) to: receive multiple data flows, each of which conveys data associated with a respective communication device present in a network environment; control conveyance of the multiple data flows; in response to detecting occurrence of an alarm event in the network environment, modify an original priority of conveying the data flows through a communication gateway, the modified priority providing increased bandwidth accommodating conveyance of a corresponding data flow associated with the alarm event through the communication gateway.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing dynamic data flow prioritization that varies depending on current network conditions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating priority settings of data flows during a non-alarm condition according to embodiments herein.

FIG. 3 is an example diagram illustrating priority settings of data flows during an alarm condition according to embodiments herein.

FIG. 5 is an example diagram illustrating bandwidth allocation to different data flows during the non-alarm condition according to embodiments herein.

FIG. 8 is an example diagram illustrating bandwidth allocation and priority associated with different data flows during the alarm condition according to embodiments herein.

Figure 1:
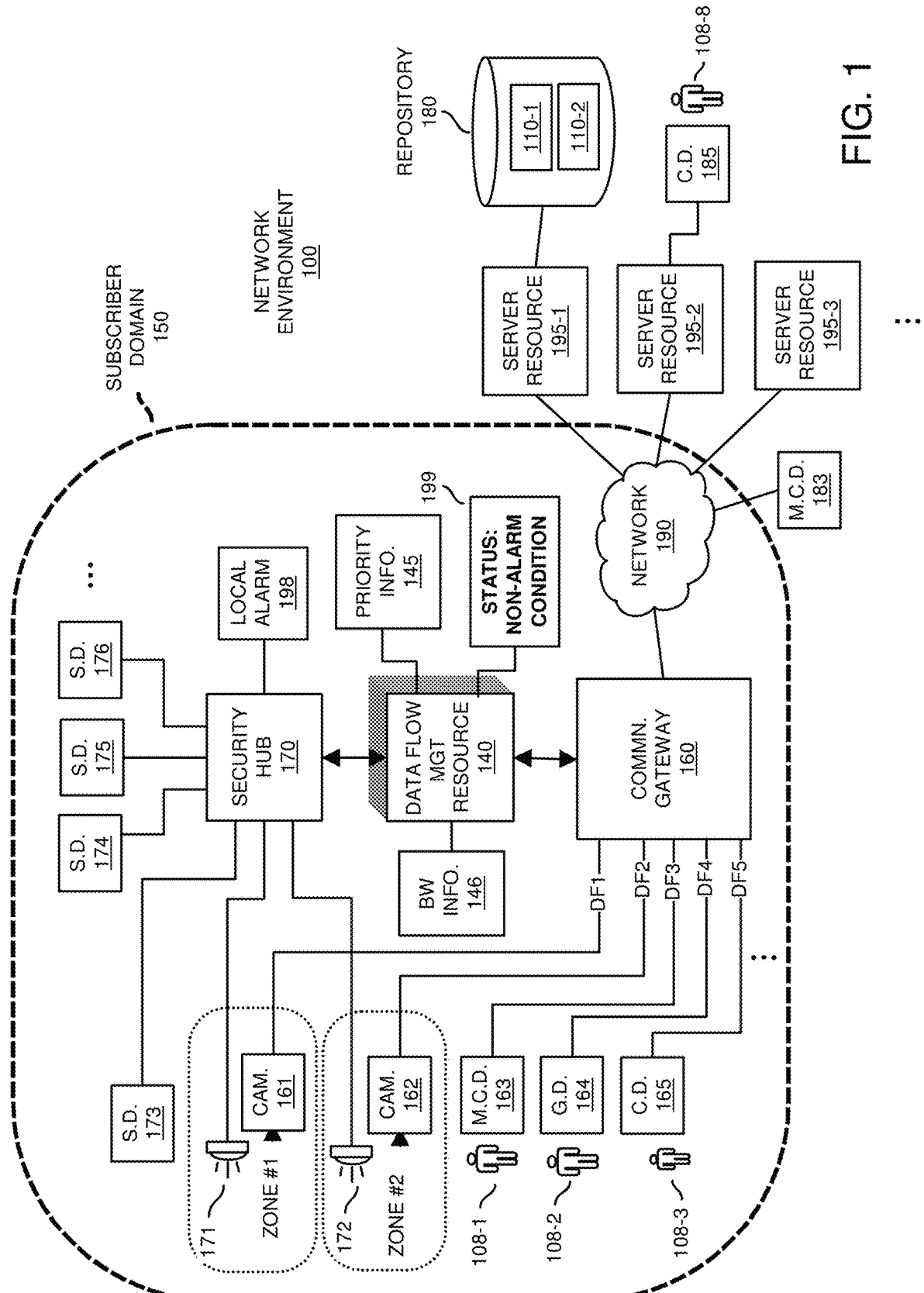
FIG. 1 is an example diagram illustrating operation of surveillance monitoring devices, non-surveillance devices, and corresponding data flow control in a subscriber domain according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments herein, a network environment includes multiple communication devices and a data flow manager resource associated with a communication gateway. During operation, the data flow manager resource receives multiple data flows from the multiple communication devices, each of which conveys data associated with a respective communication device in a network environment. The data flow manager resource controls conveyance of the multiple data flows to a remote network such as the Internet. In response to detecting occurrence of an alarm event in the network environment, the data flow manager resolution modifies a priority of conveying the data flows through the communication gateway.

In one embodiment, the modified priority provides increased bandwidth accommodating conveyance of a corresponding data flow (such as image data or other suitable data) associated with the alarm event through the communication gateway. The modified priority decreases an amount of bandwidth allocated to support one or more non-essential data flows during the alarm event.

Now, more specifically, FIG. 1 is an example diagram illustrating data flow control in a subscriber domain of a network environment according to embodiments herein.

As shown, the network environment 100 includes multiple zones including zone #1, zone #2, etc. Subscriber domain 150 includes security hub 170 and corresponding sensor devices 171, 172, 173, 174, 175, and 176. In one embodiment, each of the sensor devices is in communication with the security hub 170 over a respective wireless communication link although the devices can be connected via a physical link.

Subscriber domain 150 further includes data flow management resource 140 and communication gateway 160. In one embodiment, each of the communication devices 161, 162, 163, 164, 165, etc., is in communication with the communication gateway 160 via a respective wireless communication link although the devices can be connected via a physical link.

Note that any of the resources as described herein includes hardware or software resources (or a combination of both) in which to carry out respective operations.

For example, the data flow management resource 140 (a.k.a., data flow manager) can be configured to include data flow management hardware and/or data flow management software; security hub 170 can be configured to include security hub hardware and/or security hub software; communication gateway 160 can be configured to include communication gateway hardware and/or communication gateway software; sensor device 171 can be configured to include sensor hardware and/or sensor software; sensor device 172 can be configured to include sensor hardware and/or sensor software; and so on.

In this example embodiment, the sensor device 171 monitors zone #1 in subscriber domain 150; the sensor device 172 monitors zone #2 in a subscriber domain 150; and so on. In one embodiment, the sensor device 171 is a motion sensor monitoring for presence of intruders or motion in zone #1; the sensor device 172 is a motion sensor monitoring for presence of intruders or motion in zone #2; etc.

Further in this example embodiment, each zone includes one or more stationary or mobile objects. In one embodiment, as previously discussed, the sensor device 171 monitors zone #1 for motion of a respective one or more objects; sensor device 172 monitors zone #2 for motion of a respective one of objects; and so on.

Each of the sensor devices 173, 174, 175, 176, etc., can be configured to monitor a different attribute in the subscriber domain 150. For example, the sensor device 173 can be configured to monitor for presence of smoke in the subscriber domain 150; sensor device 174 can be configured to monitor a temperature of the subscriber domain 150; sensor device 175 can be configured to monitor for water leaks in the subscriber domain 150; sensor device 176 can be configured to monitor for carbon monoxide in the subscriber domain 150; and so on.

Note that subscriber domain 150 further includes: i) mobile communication device 163 operated by user 108-1, ii) gaming device 164 operated by the user 108-2, iii) computer device 165 operated by user 108-3, and so on.

In one embodiment, as mentioned, each of the sensor devices 171, 172, 173, etc., is in communication with the security hub 170 such as via a respective wireless or hardwired communication link (supporting a first wireless protocol). The security hub 170 manages operation of the sensor devices (such as whether they are activated or not) and provides notification of any sensed alarm conditions (as detected by any of one or more of the sensor devices) to the data flow management resource 140.

As further shown, the users 108 operate different communication devices in the subscriber domain 150. For example, user 108-1 operates mobile communication device 163 that generates uplink data flow DF3; user 108-2 operates gaming device 164 that generates uplink data flow DF4; user 108-3 operates communication device 165 that generates uplink data flow DF5; and so on.

In one embodiment, the camera device 161 generates data flow DF1; the camera device 162 generates data flow DF2; and so on.

In accordance with further embodiments, communication management resource 140 receives and manages a priority of conveying the multiple data flows DF1, DF2, DF3, DF4, DF5, etc. As previously discussed, each of the data flows DF1, DF2, DF3, DF4, DF5, etc., conveys data associated with a respective communication device (such as camera device 161, camera device 162, mobile communication device 163, gaming device 164, the computer device 165, etc.) present in network environment 100. The data flow management resource 140 (or other suitable resource) controls conveyance of the multiple data flows DF1, DF2, DF3, DF4, DF5, etc., through the communication gateway 160 depending on detected alarm status (conditions) in the subscriber domain 150.

Further embodiments herein include classifying the devices and corresponding data flows conveyed through the communication gateway. In one embodiment, the data flow management resource 140 communicates with the device and/or security 170 to identify attributes (such as network address, type of data associated with a respective data flow, etc.) associated with each of the devices.

For example, in one embodiment, classification of the devices and multiple data flows includes the data flow management resource 140 identifying a device type associated with a first communication device (such as camera device 161) operated in the subscriber domain 150. As previously discussed, the communication device 161 generates first data flow DF1 for communication through the communication gateway 160. As further discussed herein, the data flow management resource 140 or other suitable resource assigns a first priority level (LOW) in a priority hierarchy to the camera device 161 and corresponding first data flow DF1 during a non-alarm condition.

The data flow management resource 140 identifies a device type associated with the second communication device 162 operated in the subscriber domain 150; the second communication device generates a second data flow DF2 for communication through the communication gateway 160. The data flow management resource 140 assigns a second priority level (LOW) in a priority hierarchy to the camera device and corresponding second data flow DF2 during the non-alarm condition.

The data flow management resource 140 repeats this process of identifying a respective device type and classifying the device and corresponding data flow. For example, assume that the mobile communication device 163 and corresponding data flow DF3 is assigned a HIGH priority level; the gaming device 164 and corresponding data flow DF4 is assigned a MEDIUM priority level; the computer device 165 and corresponding data flow DF5 is assigned a MEDIUM priority level; and so on.

Note that the data flow management resource 140 can be configured to learn about the different devices and corresponding attributes in the subscriber domain 150 in any suitable manner. For example, the data flow management resource 140 can be configured to communicate with each of the devices, monitor communications associated with the devices, etc., to determine the nature of the respective communication devices.

Assume that the data flow management resource 140 detects an identifier value (such as network address information or other suitable information) assigned to the device as well as the type of data produced by the device. For example, the data flow management resource 140 detects that camera device 161 is a security device generating image data; the data flow management resource 140 detects that camera device 162 is a security device generating image data; the data flow management resource 140 detects that mobile communication device 163 is a phone device supporting phone calls; the data flow management resource 140 detects that gaming device 163 generates game data; etc.

In one embodiment, the data flow management resource 140 controls the data flows DF1, DF2, DF3, DF4, DF5, etc., based on a respective network address or tag information assigned to the data flows. Via the network address information (such as respective source addresses or data flow tags in respective data packets communicated from a respective communication device through the communication gateway 160), the data flow management resource 140 detects which received data corresponds to which data flow conveyed through the communication gateway 160.

In accordance with one embodiment, the data flow management resource 140 can be configured to pause or reduce bandwidth associated with data flows DF4 and DF5 associated with corresponding non-essential devices (such as gaming device 164 and computer device 165) on the network except for the safety devices (such as camera device 161, camera device 162, and mobile communication device 163) during a respective alarm event. In one embodiment, after the security hub 170 (coupled to the communication gateway 160) enters an alarm state as indicated by the status information 199, the hub 170 notifies the data flow management resource 140 of the detected alarm condition.

In one embodiment, the data flow management resource 140 uses device identification, which it uses to classify which devices are related to life-safety, video recording, or communication, i.e. smart security hub, IP camera, mobile phones. During an alarm event, the data flow management resource 140 associated with the communication gateway 160 disables non-essential or lower priority device traffic. This prevents any non-essential network traffic such as streaming video, online gaming, internet browsing, etc., from competing for bandwidth and communicating through the communication gateway 160. This provides the homeowner or users 108 (associated with the subscriber domain 150) with the strongest and most reliable connection for their safety devices (such as camera device 171, camera device 172, etc.) during an alarm condition.

As further discussed herein, after the alarm event is resolved, the (smart) security hub 170 sends another signal to the data flow management resource 140; the signal indicates that the alarm event has been resolved or terminated. In such an instance, in response to detecting the cessation of the alarm event, the data flow management resource 140 returns to a normal non-alarm mode of controlling data flows. For example, when there is no alarm, the data flow management resource 140 enables conveyance of the data flow DF4 through the communication gateway 160.

FIG. 2 is an example diagram illustrating priority settings of data flows during non-alarm conditions according to embodiments herein.

As shown, based on learning and classification as previously discussed, for the non-alarm condition, the priority information 145-1 associated with subscriber domain 150 indicates that camera device 161 is a camera assigned a LOW data flow priority level during non-alarm conditions; priority information 145-1 indicates that camera device 162 is a camera assigned a LOW data flow priority level during non-alarm conditions; priority information 145-1 indicates that mobile communication device 163 is a personal device assigned a HIGH data flow priority level during non-alarm conditions; priority information 145-1 indicates that gaming device 164 (such as a phone device) is assigned a HIGH data flow priority level during non-alarm conditions; priority information 145-1 indicates that computer device 165 is assigned a MEDIUM data flow priority during non-alarm conditions; and so on.

FIG. 3 is an example diagram illustrating priority levels associated with different data flows during a respective alarm condition according to embodiments herein.

As shown, the priority information 145-2 (for a respective alarm condition) indicates that camera device 161 is a camera assigned a HIGH data flow priority level during an alarm condition; priority information 145-2 indicates that camera device 162 is a camera assigned a HIGH data flow priority level during an alarm condition; priority information 145-2 indicates that mobile communication device 163 is a personal device assigned a HIGH data flow priority level during an alarm condition; priority information 145-2 indicates that gaming device 164 (such as a phone device) is assigned a LOW data flow priority level during an alarm condition; priority information 145-2 indicates that computer device 165 is assigned a LOW data flow priority during an alarm condition; and so on.

Thus, as shown in FIG. 2, the original priority (for a non-alarm condition) as indicated by priority information 145-1 indicates that the data flow DF4 associated with the gaming device 164 is higher in the priority hierarchy than the data flow DF1 prior to the occurrence of an alarm event (such as during a non-alarm condition). The modified priority (such as indicated by priority information 145-2) indicates that the data flow DF1 is higher in the priority hierarchy than the data flow DF4 during the occurrence of the alarm condition.

Accordingly, as further discussed below, embodiments herein include modifying priority of conveying different data flows through the communication gateway 160 upstream to network 190 depending upon the current status of the alarms associated with the subscriber domain 150. Changing the priority of each of the different data flows depending upon the current conditions associated with the subscriber domain 150 ensures that the different data flows are properly forwarded based on need. In other words, during an alarm condition, communication of gaming data from gaming device 164 in data flow DF4 is less important than communicating corresponding data in data flow DF1 provided by a respective camera device 161 during an alarm condition. Hence, the security camera 161 and data flow DF1 is assigned a higher priority during the alarm condition #1.

Figure 4:
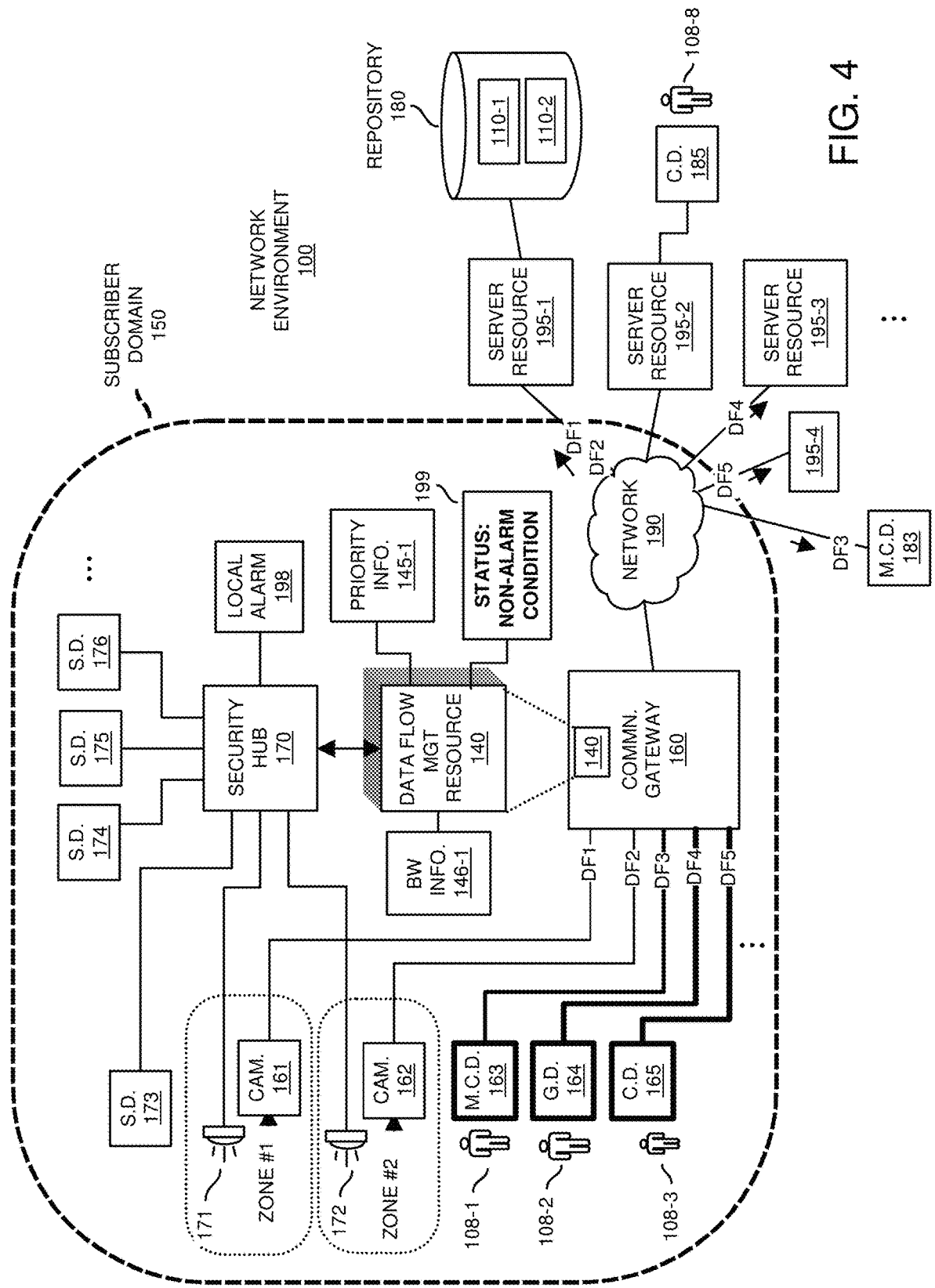
FIG. 4 is an example diagram illustrating surveillance monitoring and data flow control in a subscriber domain during a non-alarm condition according to embodiments herein.

FIG. 4 is an example diagram illustrating surveillance monitoring and data flow control in a subscriber domain during a non-alarm condition according to embodiments herein.

In this example embodiment, assume that no alarm condition is detected by any of the sensor devices 171, 172, 173, 174, 175, and 176. In such an instance, during the non-alarm condition as indicated by the status information 199, the data flow management resource 140 control conveyance of the data flows DF1, DF2, DF3, DF4, DF5, etc., via priority information 145-1 and corresponding bandwidth allocation information 146-1 associated with the non-alarm condition.

FIG. 5 is an example diagram illustrating bandwidth allocation to different data flows during the non-alarm condition according to embodiments herein.

For example, as indicated by the bandwidth allocation information 146-1, for the non-alarm condition (no alarm or trigger event occurring), the data flow management resource 140 enforces or allocates a low amount of overall available bandwidth (such as a portion of an overall 10 Megabytes per second) to the camera device 161 in the camera device 162 to support respective data flows DF1 and DF2. The data flow management resource 140 further allocates a high amount of available bandwidth to support data flow DF3 associated with the mobile communication device 163 and data flow DF4 associated with the gaming device 164. The data flow management resource 140 allocates a medium amount of bandwidth to support the data flow DF5 associated with the computer device 165.

Figure 6:
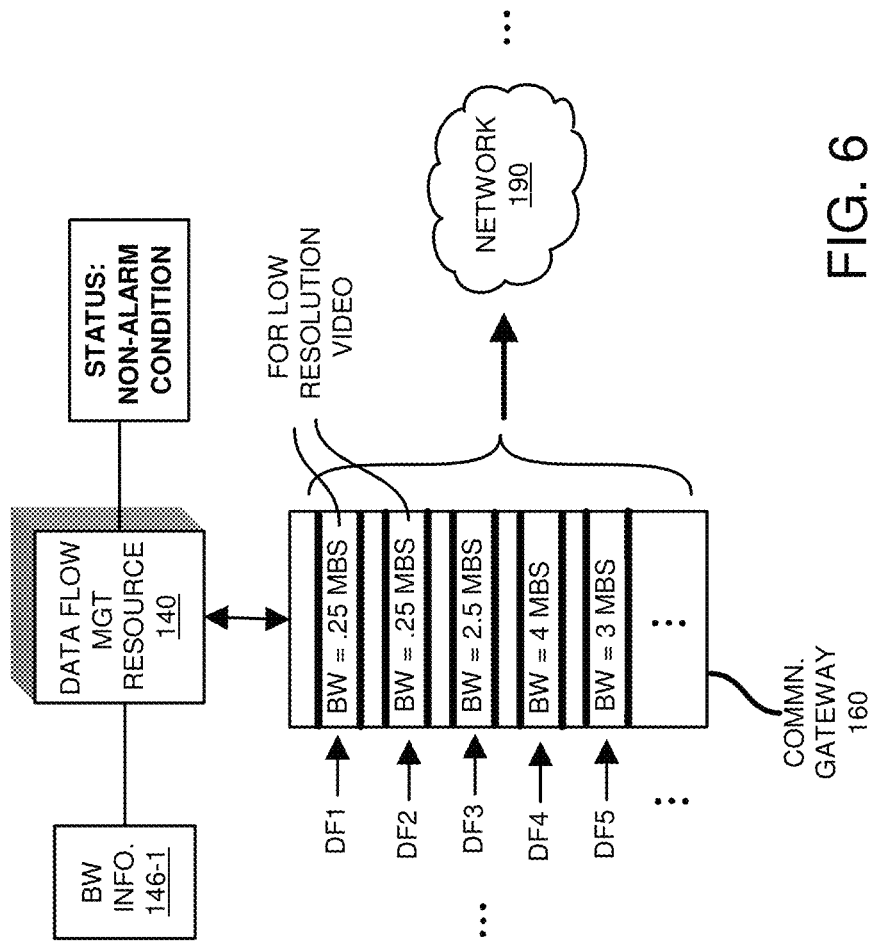
FIG. 6 is an example diagram illustrating application of specific bandwidth settings during the non-alarm condition according to embodiments herein.

FIG. 6 is an example diagram illustrating application of bandwidth settings during the non-alarm condition according to embodiments herein.

Assume in this example embodiment that the uplink through the communication gateway 160 to network 190 is limited to a flow rate value such as 10 megabytes per second. In such an instance, the data flow management resource 140 allocates different portions of the available bandwidth to the devices depending upon the status associated with the subscriber domain 150.

For example, in accordance with the priority information 145-1 and bandwidth allocation information 146-1, during the non-alarm condition, the data flow management resource 140 allocates more bandwidth to non-security/non-surveillance devices such as gaming device 164 and computer device 165 and less bandwidth to surveillance devices such as camera devices 161 and 162 because they are not needed.

More specifically, in this example embodiment, during the non-alarm condition, and in accordance with the bandwidth information 146-1, the data flow management resource 140 allocates 0.25 MBS (Mega Bytes per Second) to the camera device 161 and corresponding data flow DF1; the data flow management resource 140 allocates 0.25 MBS (Mega Bytes per Second) to the camera device 162 and corresponding data flow DF2; the data flow management resource 140 allocates 2.5 MBS (Mega Bytes per Second) to the mobile communication device 163 and corresponding data flow DF3; the data flow management resource 140 allocates 4.0 MBS (Mega Bytes per Second) to the gaming device 164 and corresponding data flow DF4; the data flow management resource 140 allocates 3.0 MBS (Mega Bytes per Second) to the computer device 165 and corresponding data flow DF5.

In one embodiment, the allocation of the 0.25 MBS of bandwidth to the data flow DF1 enables the corresponding camera device 161 to communicate at least low resolution images or fewer high resolution images (such as video) of zone #1 over the network 190 to server resource 195-1 that stores the corresponding images as content 110-1 in the repository 180 for later retrieval.

The allocation of the 0.25 MBS of bandwidth to the data flow DF2 enables the corresponding camera device 162 to communicate low resolution images or fewer high resolution images (such as video) of zone #2 over the network 190 to server resource 195-1 that stores the corresponding images as content 110-2 in the repository 180 for later retrieval. Thus, the camera devices 161 and 162 capture and transmit at least a minimal amount image data during a non-alarm condition. The balance of the available is optimally used to provide good uplink capability to the mobile communication device 163, gaming device 164, and computer device 165.

Figure 7:
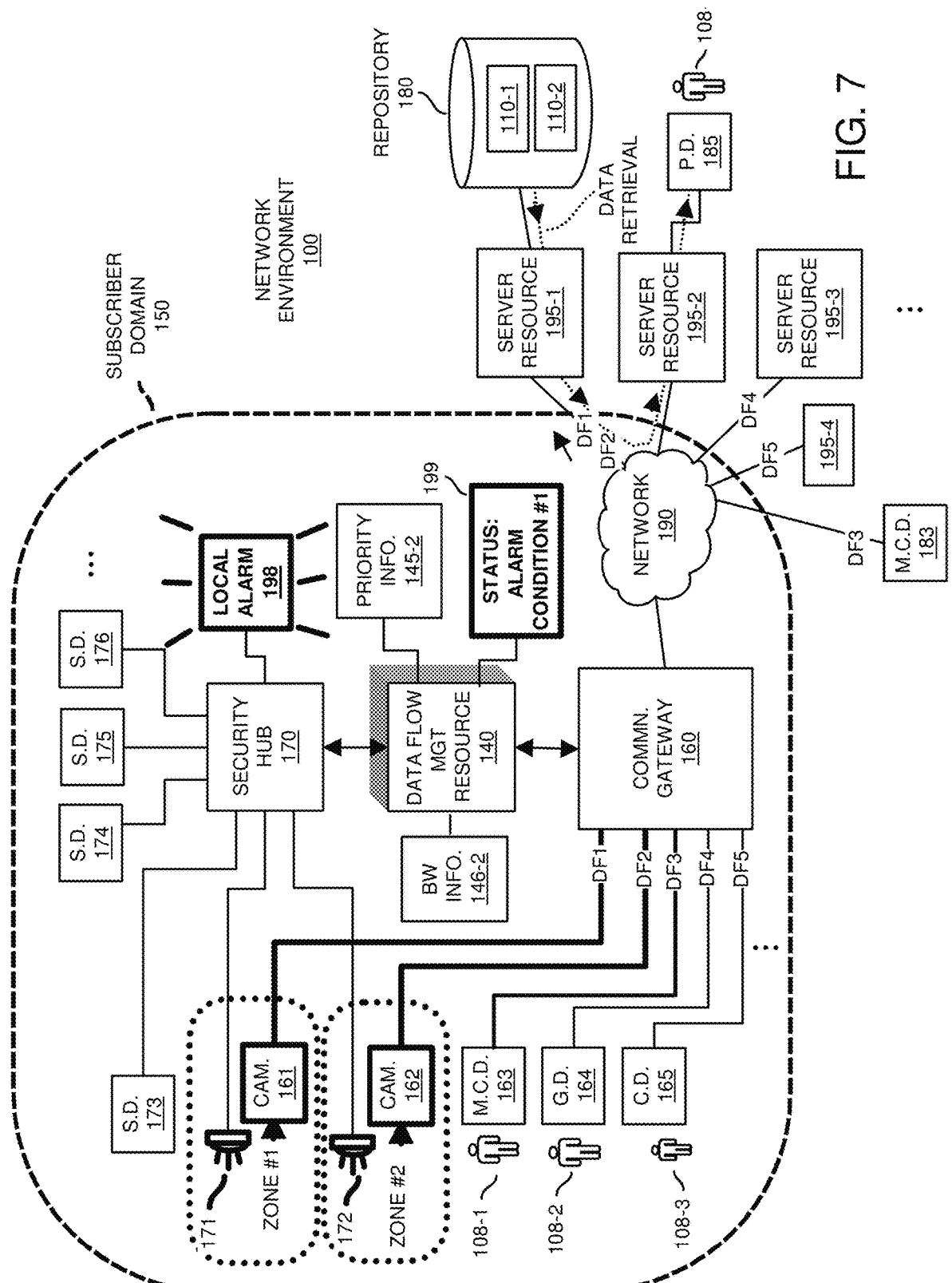
FIG. 7 is an example diagram illustrating device operation and corresponding data flow control in a subscriber domain during an alarm condition according to embodiments herein.

FIG. 7 is an example diagram illustrating surveillance monitoring and data flow control in a subscriber domain during an alarm condition according to embodiments herein.

In accordance with further embodiments, in response to detecting occurrence of an alarm event (condition) in the subscriber domain 150 of the network environment 150 such as via communication from the security hub 170 to the data flow management resource 140 indicating that the sensor device 171 and/or sensor device 172 detects an alarm event (such as alarm condition #1), the data flow management resource 140 sets status information 199 to indicate the current state (such as alarm condition #1) of the subscriber domain 150 as an alarm state.

In response to the alarm event (such as alarm condition #1), the data flow management resource 140 modifies an original priority of conveying the data flows DF1, DF2, DF3, DF4, DF5, etc., through the communication gateway 140 to accommodate the alarm condition. In one embodiment, as previously discussed, the modified priority of the data flows DF1, DF2, DF3, DF4, DF5, etc., and conveyance through the communication gateway 160 provides increased bandwidth accommodating conveyance of a corresponding data flow such as data flows DF1 and DF2 associated with camera device 161 and/or camera device 162 associated with the alarm event through the communication gateway 160.

In one embodiment, in response to detecting the occurrence of the alarm event, the data flow management resource 140: i) de-allocates the bandwidth from communicating the data flow DF4 generated by the gaming device 164 (as discussed above in FIG. 4); and ii) allocates all or a portion of this bandwidth to provide the increased bandwidth and conveyance of the corresponding data flow DF1 and/or DF2 associated with the alarm event through the communication gateway 160.

In one embodiment, any suitable resource such as the data flow management resource 140, sensor devices 161 and 162, and/or the security hub 170 provides notification of the alarm event (as detected by the sensor device 171 or sensor device 172) to the camera device 161 and/or camera device 162. In one embodiment, in response to detecting the alarm event, the camera device 161 and the camera device 162 switchover to operating in a high resolution image capture mode. Data associated with the captured images is conveyed over data flows DF1 and DF2.

Note that, Subsequent to notification of termination of the alarm event, the camera device 161 and the camera device 162 operate in a low resolution image capture mode again as the high resolution images or high bandwidth video data is not needed. As previously discussed, repository 180 stores image data from the camera devices 161 and 162 as respective retrievable data 110-1 an 110-2.

More specifically, the remote storage repository 180 stores low resolution images 110-1 (as received from data flow DF1 and DF2) as captured during the non-alarm conditions; the remote storage repository 180 stores high resolution images 110-2 (as received from data flow DF1 and DF2) as captured during the alarm conditions.

In one embodiment, the data flow management resource or other suitable resource provides notification of a location of the remote storage repository 180 to a playback device 185 or corresponding personnel 108-8. This enables the monitoring personnel 108-8 to retrieve data 110-1 and 110-2 and view the respective images on playback device 185.

FIG. 8 is an example diagram illustrating bandwidth allocation to different data flows during the alarm condition according to embodiments herein.

For example, as indicated by the bandwidth allocation information 146-2, for a respective alarm condition (such as detection of an alarm trigger event) in a respective zone of the subscriber domain 150, the data flow management resource 140 enforces or allocates a high amount of available bandwidth to each of the camera device 161 and the camera device 162 to support respective data flows DF1 and DF2. The data flow management resource 140 further allocates a high amount of available bandwidth to support data flow DF3 associated with the mobile communication device 163 as such a device may be useful during the alarm condition such as to call appropriate personnel 108-8. As further shown by the bandwidth allocation information 146-2, the data flow management resource 140 enforces allocation of a low amount of bandwidth to each of the gaming device 164 and the computer device 165 since such devices are not particularly useful during the alarm condition and resolving same.

Figure 9:
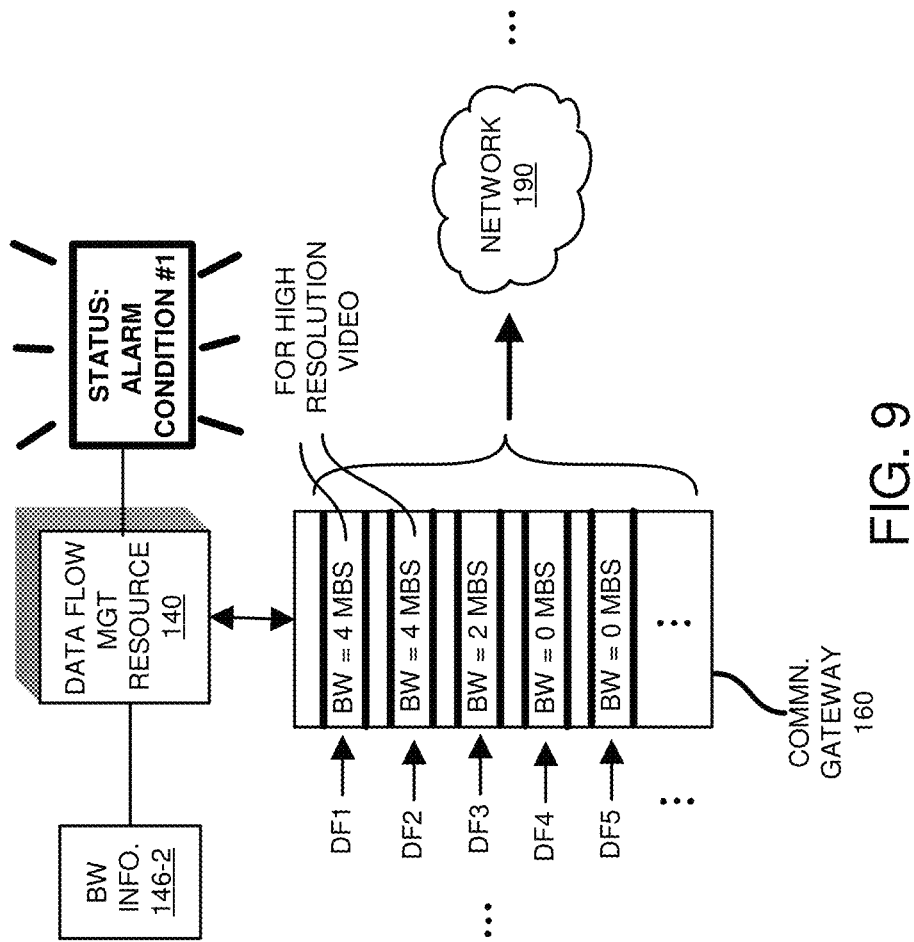
FIG. 9 is an example diagram illustrating application of bandwidth settings during the alarm condition according to embodiments herein.

FIG. 9 is an example diagram illustrating application of bandwidth settings during the non-alarm condition according to embodiments herein.

Similar to the prior example, assume that the uplink through the communication gateway 160 to network 190 is limited to a flow rate value such as 10 megabytes per second. In such an instance, the data flow management resource 140 allocates different portions of the available bandwidth to the devices depending upon the alarm condition status associated with the subscriber domain 150.

For example, in accordance with the priority information 145-2 and corresponding bandwidth allocation information 146-2, during the alarm condition #1, the data flow management resource 140 allocates less bandwidth to non-security/surveillance devices such as gaming device 164 and computer device 165 and more bandwidth to surveillance devices such as camera devices 161 and 162 because they are more useful during the alarm condition.

More specifically, in this example embodiment, in accordance with the priority information 145-2 and bandwidth allocation information 146-2 during the alarm condition, the data flow management resource 140 allocates 4.0 MBS (Mega Bytes per Second) to the camera device 161 and corresponding data flow DF1; the data flow management resource 140 allocates 4.0 MBS (Mega Bytes per Second) to the camera device 162 and corresponding data flow DF2; the data flow management resource 140 allocates 2.0 MBS (Mega Bytes per Second) to the mobile communication device 163 and corresponding data flow DF3.

As previously discussed, the data flow management resource 140 reduces an amount of bandwidth allocated to the gaming device 164 and the computer device 165 because they are not particularly useful during the alarm condition. For example, during the alarm condition #1, the data flow management resource 140 allocates 0.0 MBS (Mega Bytes per Second) to the gaming device 164 and corresponding data flow DF4; the data flow management resource 140 allocates 0.0 MBS (Mega Bytes per Second) to the computer device 165 and corresponding data flow DF5.

In one embodiment, as previously discussed, the allocation of the 4.0 MBS of bandwidth to the data flow DF1 enables the corresponding camera device 161 to communicate high resolution images (such as high bandwidth video) of zone #1 over the network 190 to server resource 195-1 that stores the corresponding images as content 110-2 in the repository 180 for later retrieval. The allocation of the 4.0 MBS of bandwidth to the data flow DF2 enables the corresponding camera device 162 to communicate high resolution images (such as high bandwidth video) of zone #2 over the network 190 to server resource 195-1 that stores the corresponding images as content 110-2 in the repository 180 for later retrieval. Thus, the camera devices 161 and 162 capture and transmit the more important image data during an alarm condition. Because they are nonessential, the gaming device 164 and computer device 165 are allocated little or no uplink bandwidth.

In one embodiment, substantial reduction of bandwidth itself provides some amount of notification to a user 108-2 in the subscriber domain 150 of the alarm condition as the gaming device 164 and computer device 165 may no longer work properly. Note that, in accordance with further embodiments, to provide more direct notification of the alarm condition #1, the data flow management resource 140 can be configured to generate one or more messages for display on a respective display screen of the different devices 163, gaming device 164, computer device 165, etc. In such an instance, the one or more respective users 108 in the subscriber domain 150 are immediately notified of the alarm condition.

As further shown in FIG. 7, note that the data flow management resource 140 (or other suitable resource) can be configured to activate the local alarm 198 (audible, visual, etc.) to notify user 108 in the subscriber domain 150 of the respective detected alarm condition.

Note again that the data flow settings can be dynamically set for any of multiple different settings. For example, in one embodiment, bandwidth assigned to data flows DF4 and DF5 can be reduced to provide bandwidth to one or more data flows associated with the sensor devices 173, 174, 175, 176, etc., through a combination of security hub 170, data flow management resource 140, and communication gateway 160 to the network 190 during a respective alarm condition #2.

In accordance with another embodiment, bandwidth assigned to data flows DF1 and DF2 can be reduced to zero to provide bandwidth to one or more data flows associated with the sensor devices 173, 174, 175, 176, etc., through a combination of security hub 170, data flow management resource 140, and communication gateway 160 to the network 190 during an alarm condition #3.

Figure 10:
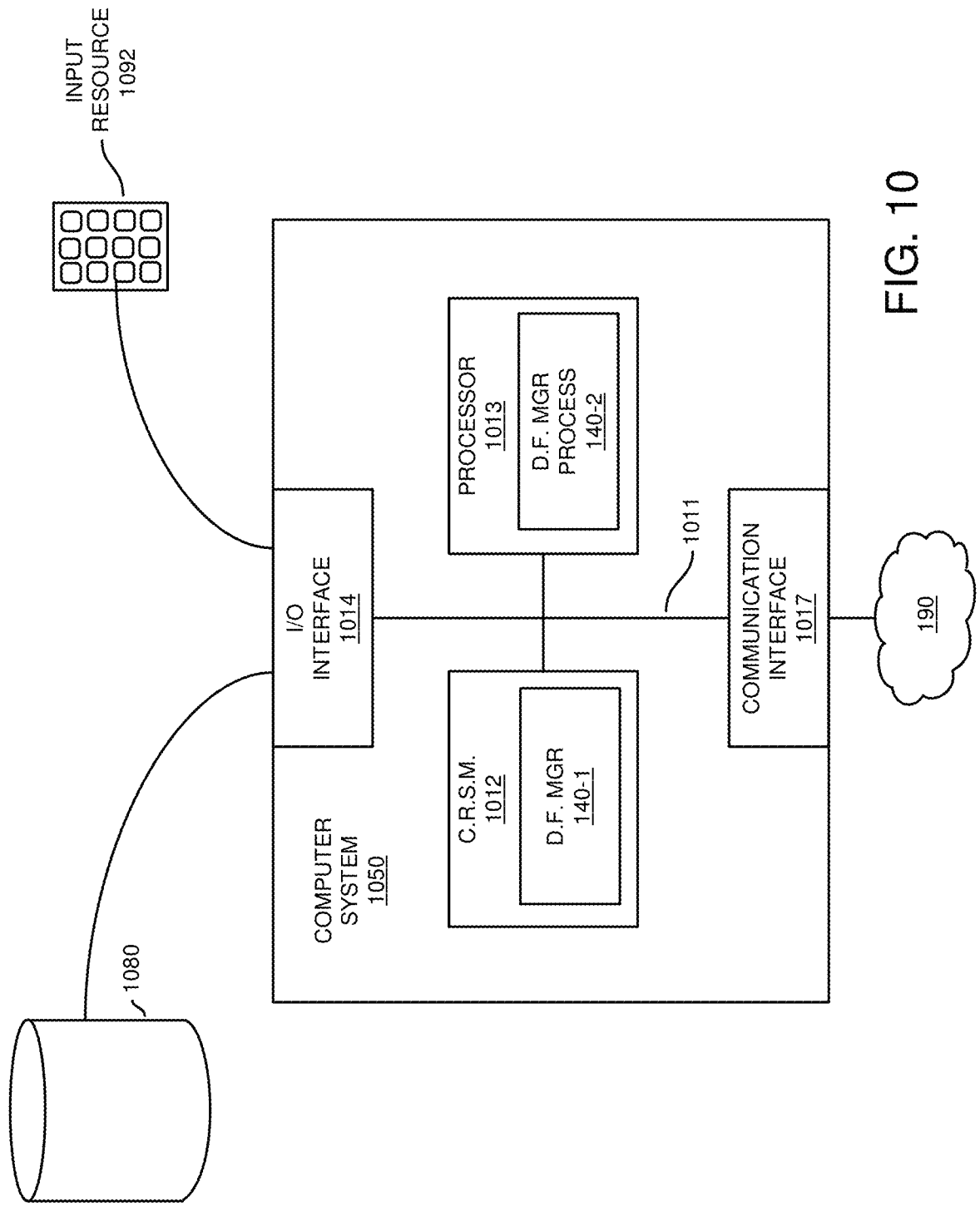
FIG. 10 is an example diagram illustrating example computer hardware and software operable to execute one or more operations according to embodiments herein.

FIG. 10 is an example block diagram of a computer system for implementing any of the operations as previously discussed according to embodiments herein.

Note again that any of the resources (such as data flow management resource 140, security hub 170, communication gateway 160, any of sensor devices 171, 172, 173, etc., any of communication devices 161, 162, 163, 164, etc.) as discussed herein can be configured to include computer processor hardware and/or corresponding executable instructions to carry out the different operations as discussed herein.

As shown, computer system 1050 of the present example includes an interconnect 1011 coupling computer readable storage media 1012 such as a non-transitory type of media (which can be any suitable type of hardware storage medium in which digital information can be stored and retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with data flow manager application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in the data flow manager application 140-1 stored on computer readable storage medium 1012. Execution of the data flow manager application 140-1 produces data flow manager process 140-2 to carry out any of the operations and/or processes as discussed herein.

Those skilled in the art will understand that the computer system 1050 can include other processes and/or software and hardware components, such as an operating system that controls allocation and use of hardware resources to execute data flow manager application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIG. 11. Note that the steps in the flowcharts below can be executed in any suitable order.

Figure 11:
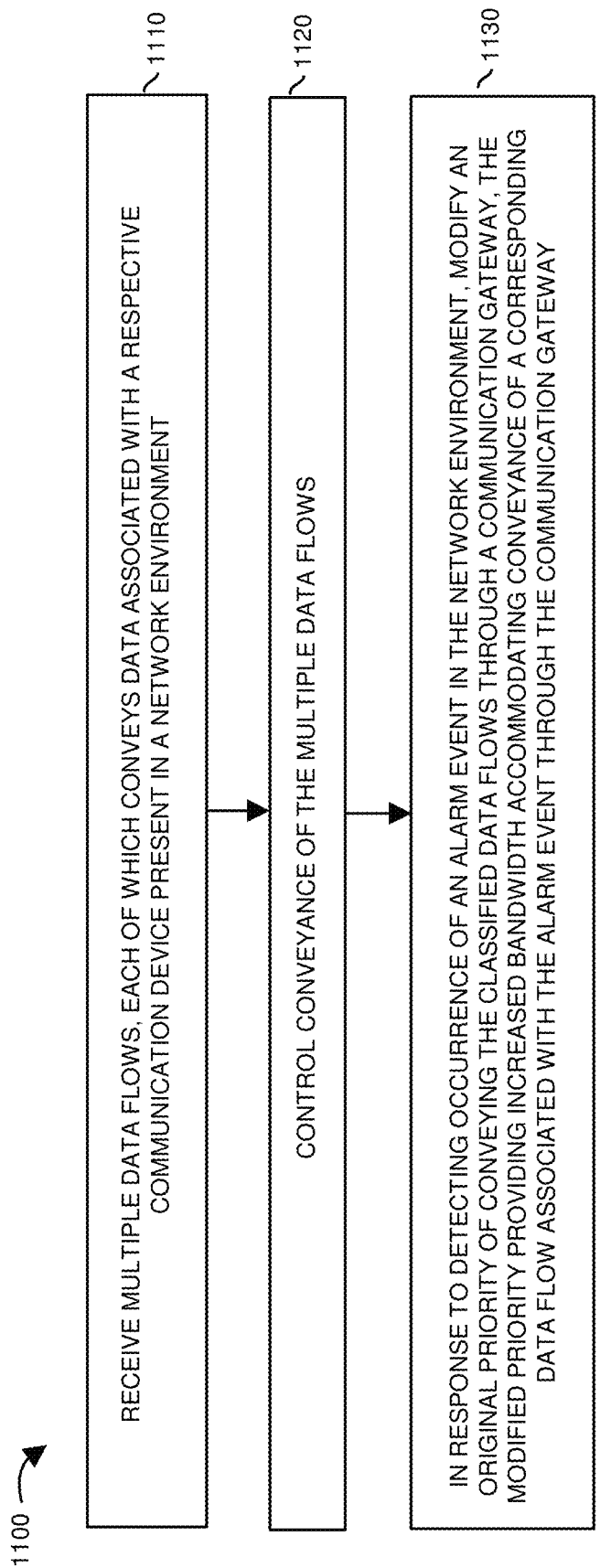
FIG. 11 is an example diagram illustrating a method according to embodiments herein.

FIG. 11 is a flowchart 1100 illustrating an example method according to embodiments herein. Note that there will be some overlap with respect to concepts as discussed above.

In processing operation 1110, the data flow management resource 140 receives multiple data flows DF1, DF2, DF3, DF4, DF5, etc., each of which conveys data associated with a respective communication device present in the network environment 100.

In processing operation 1120, the data flow management resource 140 controls conveyance of the multiple data flows DF1, DF2, DF3, DF4, DF5, etc. in accordance with current conditions of the subscriber domain 150.

In processing operation 1130, in response to detecting occurrence of an alarm event (or a particular operating condition) in the network environment 100 and/or the subscriber domain 150, the data flow management resource 140 modifies an original priority (and/or bandwidth allocation) of conveying the classified data flows DF1, DF2, DF3, DF4, DF5, etc., through the communication gateway 160. The modified priority (such as indicated by the priority information 145-2 and/or bandwidth allocation information 146-2) provides increased bandwidth accommodating conveyance of one or more corresponding data flows (such as data flow DF1 and data flow DF2) associated with the alarm event through the communication gateway 160.

Note again that techniques herein are well suited to facilitate dynamic prioritization of data flows depending on occurrence of different events in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has (or inventions have) been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a communication gateway, receiving multiple data flows from different types of communication devices over multiple communication links, each of which conveys data associated with a respective communication device present in a network environment;
   prior to detecting occurrence of a trigger event, controlling conveyance of the multiple data flows from the different types of communication devices through the communication gateway in an uplink over a network in accordance with first uplink bandwidth settings assigned to the multiple data flows, the first uplink bandwidth settings providing a first uplink bandwidth to convey a first data flow of the multiple data flows in the uplink over the network; and
   in response to detecting occurrence of the trigger event in the network environment, controlling conveyance of the multiple data flows through the communication gateway in the uplink over the network in accordance with second uplink bandwidth settings assigned to the multiple data flows, the trigger event associated with the first data flow of the multiple data flows, the second uplink bandwidth settings providing second uplink bandwidth to convey the first data flow in the uplink over the network, the second uplink bandwidth being greater than the first uplink bandwidth.

2. The method as in claim 1, wherein the trigger event is an alarm event, the method further comprising:
   in response to detecting cessation of the alarm event, reverting to management of conveying the multiple data flows through the communication gateway in the uplink in accordance with the first uplink bandwidth settings implemented by the communication gateway prior to the occurrence of the trigger event.

3. The method as in claim 1 further comprising:
   classifying the multiple data flows, classification including:
      identifying a device type associated with a first communication device operated in the network environment, the first communication device operable to generate the first data flow for communication through the communication gateway;
      via the first uplink bandwidth settings, assigning a first priority level in a priority hierarchy to the first data flow;
      identifying a device type associated with a second communication device operated in the network environment, the second communication device operable to generate a second data flow for communication through the communication gateway;
      via the first uplink bandwidth settings, assigning a second priority level in the priority hierarchy to the second data flow, the second priority level higher than the first priority level during a non-alarm condition prior to detecting occurrence of the trigger event;
      via the second uplink bandwidth settings, assigning the second priority level in the priority hierarchy to the first data flow; and
      via the second uplink bandwidth settings, assigning a first priority level in the priority hierarchy to the second data flow, the second priority level higher than the first priority level during an alarm condition as indicated by the trigger event.

4. The method as in claim 1, wherein the first data flow includes data packets received from a first communication device; and
   wherein controlling conveyance of the multiple data flows includes: communicating the data packets in the uplink based on the first uplink bandwidth settings and the second uplink bandwidth settings.

5. The method as in claim 4, wherein the trigger event is an alarm event, the method further comprising:
   providing notification of the alarm event to the first communication device.

6. The method as in claim 1 further comprising:
   receiving the first data flow from a first communication device in the network environment prior to detecting the occurrence of the trigger event;
   prior to detecting the occurrence of the trigger event: communicating the first data flow from the first communication device in accordance with the first uplink bandwidth in the uplink over the network from the communication gateway; and
   in response to detecting the occurrence of the trigger event in the network environment: communicating the first data flow from the first communication device in accordance with the second uplink bandwidth in the uplink over the network from the communication gateway.

7. The method as in claim 6, wherein the trigger event is an alarm event, the method further comprising:
   in response to detecting the alarm event, providing notification to the first communication device, the notification indicating to increase a bandwidth of image data communicated by the first communication device over the first data flow to the communication gateway; and
   transmitting the image data via the second uplink bandwidth in the uplink over the network from the communication gateway during the alarm event.

8. The method as in claim 7 further comprising:
   receiving the notification from a second communication device monitoring a region of the network environment in which the first communication device resides; and
   wherein the second uplink bandwidth settings reduce bandwidth allocated to a third communication device with respect to the second uplink bandwidth settings to provide the second uplink bandwidth to the first data flow.

9. The method as in claim 1, wherein a first communication device of the different types of communication devices in the network environment generates the first data flow, the method further comprising:
   communicating the first data flow received from the first communication device in the uplink over the network from the communication gateway to a remote storage repository with respect to the network environment.

10. The method as in claim 9 further comprising:
    providing notification of a location of the remote storage repository to a playback device, the remote storage repository storing a first portion of the first data flow and a second portion of the first data flow generated by the first communication device, the first portion of the first data flow generated prior to the trigger event, the second portion of the first data flow generated after the trigger event; and
    wherein the first portion of the first data flow includes first images captured by the first communication device at a first resolution; and
    wherein the second portion of the first data flow includes second images captured by the second communication device at a second resolution, the second resolution greater than the first resolution.

11. The method as in claim 1, wherein receiving the multiple data flows includes:
    at the communication gateway:
       receiving the first data flow over a first wireless communication link from a first communication device of the different types of communication devices in the network environment; and
       receiving a second data flow over a second wireless communication link from a second communication device of the different types of communication devices.

12. The method as in claim 11, wherein the first uplink bandwidth settings allocate more bandwidth in the uplink to the second data flow than the first data flow; and
    wherein the second uplink bandwidth settings allocate more bandwidth to the first data flow than the second data flow.

13. The method as in claim 11 further comprising:
    communicating with each of the different types of communication devices to identify a respective network address of each of the different types of communication devices.

14. The method as in claim 13 further comprising:
    via the first uplink bandwidth settings and the second uplink bandwidth settings, controlling conveyance of the first data flow and the second data flow in the uplink over the network from the communication gateway based on respective network addresses assigned to the different types of communication devices.

15. The method as in claim 14, wherein controlling conveyance of the first data flow and the second data flow includes:
    at the communication gateway:
       processing data packets associated with the first data flow and the second data flow;
       via the processing, detecting the first data flow and the second data flow based on source network addresses of data packets received over the first wireless communication link and the second wireless communication link; and
       transmitting the data packets from the communication gateway in the uplink over the network depending on the source network addresses and the first uplink bandwidth settings and the second uplink bandwidth settings.

16. The method as in claim 11 further comprising:
    communicating with each of the different types of communication devices to identify a respective device type of each of the different types of communication devices; and
    based on the identified device types, classifying each of the different types of communication devices.

17. The method as in claim 16 further comprising:
    via the first uplink bandwidth settings and the second uplink bandwidth settings, controlling conveyance of the first data flow and the second data flow from the communication gateway in the uplink over the network based on the identified device types associated with the different types of communication devices.

18. The method as in claim 17, wherein controlling conveyance of the first data flow and the second data flow includes:

at the communication gateway, processing data packets associated with the first data flow and the second data flow from the different types of communication devices; and transmitting the data packets from the communication gateway in the uplink to a remote network depending on the identified device types associated with the different types of communication devices and the first uplink bandwidth settings and the second uplink bandwidth settings.

19. The method as in claim 14, wherein the first communication device is a security camera;

wherein the second communication device is a mobile device operated by a user; and the method further comprising: providing notification of the trigger event to the second communication device as a response to detecting the alarm event.

20. The method as in claim 19, wherein the first uplink bandwidth settings indicate to provide, to the second data flow, third uplink bandwidth through the communication gateway in the uplink; and wherein the second uplink bandwidth settings indicate to provide, to the second data flow, fourth bandwidth through the communication gateway in the uplink, the fourth uplink bandwidth less than the third bandwidth.

21. The method as in claim 1, wherein each of the data flows includes data packets;

wherein the first data flow is received from a first communication device;

wherein controlling conveyance of the multiple data flows through the communication gateway in the uplink over the network in accordance with first uplink bandwidth settings assigned to the multiple data flows includes communicating the first data flow in the uplink to a first destination network address as specified by data packets in the first data flow; and wherein controlling conveyance of the multiple data flows through the communication gateway in the uplink over the network in accordance with second uplink bandwidth settings assigned to the multiple data flows includes communicating the first data flow in the uplink to the first destination network address as specified by data packets in the first data flow.

22. The method as in claim 21, wherein controlling conveyance of the multiple data flows through the communication gateway in the uplink over the network in accordance with first uplink bandwidth settings assigned to the multiple data flows includes communicating a second data flow received from a second communication device in the uplink to a second destination network address as specified by data packets in the second data flow; and wherein controlling conveyance of the multiple data flows through the communication gateway in the uplink over the network in accordance with second uplink bandwidth settings assigned to the multiple data flows includes communicating the second data flow in the uplink to the second destination network address as specified by data packets in the second data flow.

23. The method as in claim 1, wherein a first total bandwidth allocated to the multiple data flows as specified by the first uplink bandwidth settings is equal to a second total bandwidth allocated to the multiple data flows as specified by the second uplink bandwidth settings.

24. The method as in claim 1, wherein the trigger event is an alarm event, the method further comprising:

in response to detecting the alarm event, providing notification to a first communication device producing the first data flow, the notification indicating to increase a bandwidth of image data communicated by the first communication device over the first data flow to the communication gateway; and conveying the image data from the first communication device via the second uplink bandwidth in the uplink over the network from the communication gateway during the alarm event.

25. The method as in claim 24, wherein the first communication device is a camera producing the image data; and wherein the different types of communication devices includes the first communication device and a second communication device, a second data flow of the different types of data flows generated by the second communication device, the second communication device being a computer device operated by a user to communicate with a remote server through the communication gateway via the second data flow.

26. The method as in claim 3, wherein the first communication device is a camera device that produces images communicated over the first data flow; and wherein the second communication device is a computer device operated by a user to communicate with a remote server via the second data flow through the communication gateway.

27. The method as in claim 1, wherein the first data flow is generated by a first communication device, the first communication device being a camera producing image data communicated over the first data flow; and wherein the multiple data flows include a second data flow generated by a second communication device, the second communication device being a computer device operated by a user to communicate with a remote server through the communication gateway via the second data flow.

28. The method as in claim 1, wherein the different types of communication devices include a first communication device generating the first data flow, the first communication device being a camera producing image data, the first data flow conveying the image data, the method further comprising:

receiving notification of the trigger event from a sensor device monitoring a region in which the first communication device resides.

29. The method as in claim 28 further comprising:

in response to receiving notification of the trigger event, notifying the first communication device to increase a bandwidth of the image data communicated in the first data flow.

30. The method as in claim 29, wherein the multiple data flows include a second data flow generated by a second communication device, the second communication device being a computer device operated by a user to communicate with a remote server through the communication gateway via the second data flow; and wherein the second uplink bandwidth settings indicate to provide a lower uplink bandwidth for the second data flow during the trigger event than as indicated by the first uplink bandwidth settings to accommodate the increase in bandwidth of image data communicated in the first data flow.

31. A system comprising:

data flow management hardware operable to:

receive multiple data flows from multiple communication devices over multiple communication links, each of which conveys data associated with a respective communication device in a network environment;

prior to detecting occurrence of a trigger event, control conveyance of the multiple data flows from a gateway in an uplink over a network in accordance with first uplink bandwidth settings, the first uplink bandwidth settings providing a first uplink bandwidth to convey a first data flow of the multiple data flows in the uplink over the network from the gateway; and in response to detecting occurrence of the trigger event in the network environment, implement second uplink bandwidth settings as a replacement to the first uplink bandwidth settings, the second uplink bandwidth settings providing the first data flow second uplink bandwidth to convey the first data flow in the uplink over the network, the second uplink bandwidth being greater than the first uplink bandwidth.

32. The system as in claim 31, wherein the data flow management hardware is further operable to:

identify a device type associated with a first communication device operated in the network environment, the first communication device operable to generate the first data flow for communication through the gateway in the uplink;

assign a first priority level in a priority hierarchy to the first data flow;

identify a device type associated with a second communication device operated in the network environment, the second communication device operable to generate a second data flow for communication through the communication gateway in the uplink; and assign a second priority level in the priority hierarchy to the second data flow.

33. The system as in claim 31 wherein the data flow management hardware is further operable to:

in response to detecting non-occurrence of the trigger event, via the first uplink bandwidth settings, allocate first bandwidth to the first data flow, the first data flow associated with a first communication device in the network environment;

in accordance with the first uplink bandwidth settings, communicate the first data flow over the first bandwidth from the first communication device through the gateway in the uplink over the network to a corresponding first remote destination; and in response to detecting the occurrence of the trigger event: in accordance with the second uplink bandwidth settings, allocating the second bandwidth to the first data flow, the first data flow conveying images associated with the trigger event, the trigger event being an alarm event.

34. The system as in claim 31, wherein the data flow management hardware is further operable to:

receive the first data flow from a first communication device in the network environment prior to detecting the occurrence of the trigger event;

prior to detecting the occurrence of the trigger event: communicate the first data flow received from the first communication device in the uplink from the gateway in accordance with the first uplink bandwidth; and in response to detecting the occurrence of the trigger event in the network environment: communicate the first data flow received from the first communication device in accordance with the second uplink bandwidth.

35. The system as in claim 34, wherein the trigger event is an alarm event; and wherein the data flow management hardware is further operable to:

in response to detecting the alarm event, provide notification to the first communication device, the notification indicating to increase a bandwidth of images communicated by the first communication device over the first data flow to the gateway; and convey the images captured by the first communication device via the second uplink bandwidth from the gateway in the uplink over the network during the alarm event.

36. The system as in claim 35, wherein the data flow management hardware is further operable to:

receive the notification from a second communication device monitoring a region of the network environment in which the first communication device resides; and reduce uplink bandwidth allocated to a third communication device in the network environment to provide the second uplink bandwidth to the first data flow.

37. Computer-readable storage hardware having instructions stored thereon, the instructions, when carried out by computer processor hardware, cause the computer processor hardware to:

at a gateway, receive multiple data flows from multiple communication devices over multiple wireless communication links, each of which conveys data associated with a respective communication device in a network environment;

prior to detecting occurrence of a trigger event, control conveyance of the multiple data flows through the gateway in an uplink over a network via first uplink bandwidth settings, the first uplink bandwidth settings specifying a first uplink bandwidth to convey a first data flow of the multiple data flows in the uplink over the network; and in response to detecting occurrence of the trigger event in the network environment, implement second uplink bandwidth settings as a replacement to the first uplink bandwidth settings, the second uplink bandwidth settings providing second uplink bandwidth to convey the first data flow in the uplink over the network, the second uplink bandwidth being greater than the first uplink bandwidth.

* * * * *